(12) United States Patent
White

(10) Patent No.: US 7,819,413 B2
(45) Date of Patent: Oct. 26, 2010

(54) AERODYNAMIC STORAGE ELEMENT AND FRAME

(76) Inventor: Philip White, 667 Beresford Avenue, Toronto, Ontario (CA) M6S 3C4

( * ) Notice: Subject to any disclaimer, the term of this patent is extended or adjusted under 35 U.S.C. 154(b) by 377 days.

(21) Appl. No.: 11/889,204

(22) Filed: Aug. 9, 2007

(65) Prior Publication Data
US 2008/0036171 A1 Feb. 14, 2008

Related U.S. Application Data

(60) Provisional application No. 60/836,684, filed on Aug. 10, 2006.

(51) Int. Cl.
*B62K 19/40* (2006.01)
(52) U.S. Cl. .................... 280/281.1; 224/425
(58) Field of Classification Search ............. 280/281.1, 280/274; 224/425, 426
See application file for complete search history.

(56) References Cited

U.S. PATENT DOCUMENTS

| 4,667,881 | A | | 5/1987 | Michelotti |
| 4,809,890 | A | | 3/1989 | Tsigadas |
| 5,158,218 | A | * | 10/1992 | Wery .......................... 222/610 |
| 5,201,442 | A | | 4/1993 | Bakalian |
| 5,607,087 | A | * | 3/1997 | Wery et al. .................. 222/610 |
| 5,788,134 | A | * | 8/1998 | Matic, Jr. .................... 224/414 |
| 5,823,557 | A | * | 10/1998 | Penza ....................... 280/304.5 |
| 6,253,979 | B1 | * | 7/2001 | Samson ...................... 224/426 |
| 6,401,997 | B1 | * | 6/2002 | Smerdon, Jr. ............... 224/414 |
| 7,000,936 | B2 | * | 2/2006 | Schmider ................. 280/281.1 |
| 2007/0278273 | A1 | | 12/2007 | Hollis |

FOREIGN PATENT DOCUMENTS

| DE | 9419269 | 2/1995 |
| EP | 0037275 | 10/1981 |
| EP | 0198284 | 10/1986 |
| FR | 2332168 | 6/1977 |
| FR | 2550154 | 2/1985 |
| WO | WO 2007/143608 | 12/2007 |

* cited by examiner

*Primary Examiner*—Tony H. Winner
(74) *Attorney, Agent, or Firm*—Riches, McKenzie & Herbert LLP

(57) ABSTRACT

The present invention is directed to a storage element and bicycle frame that work in conjunction with each other. The present invention to makes both the frame and storage element as aerodynamic as possible when the storage element is attached to the frame. The storage element is designed to function as an integral aerodynamic element of the frame.

27 Claims, 10 Drawing Sheets

Section A-A

Section B-B

Section C-C

Section D-D

Section E-E

Section F-F

Section A-A

Section B-B

Section C-C

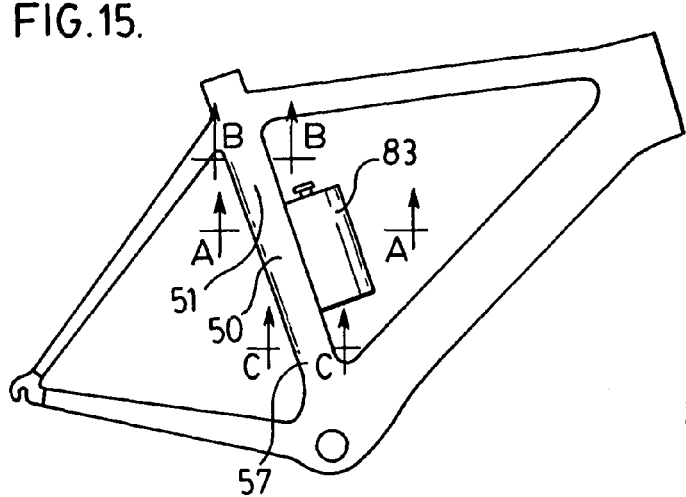
FIG.15.
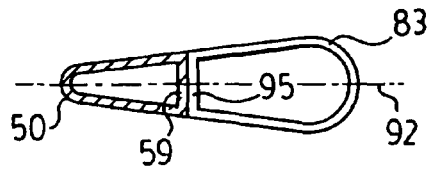
FIG.16. Section A-A
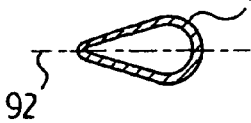
FIG.17. Section B-B
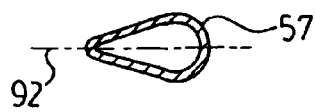
FIG.18. Section C-C
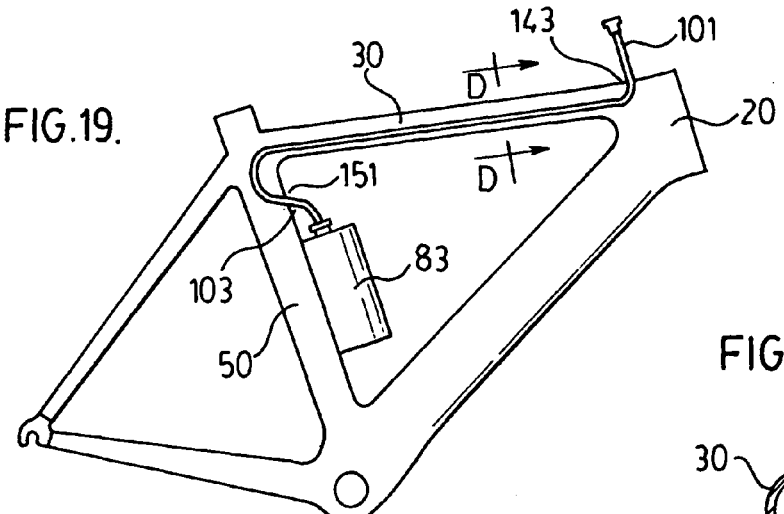
FIG.19.
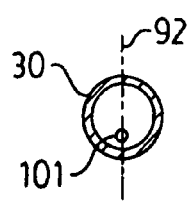
FIG.20.

Section A-A

Section B-B

Section A-A

Section B-B

AERODYNAMIC STORAGE ELEMENT AND FRAME

RELATED APPLICATION

This application is related to and claims the benefit as under 35 U.S.C. 119 of U.S. Provisional Patent Application No. 60/836,684 filed Aug. 10, 2006

FIELD OF THE INVENTION

The present invention relates to an aerodynamic storage element designed to work in conjunction with an aerodynamic bicycle frame, more particularly a storage element designed in conjunction with the frame so as to increase the collective aerodynamic function of both the storage element and the frame.

BACKGROUND OF THE INVENTION

A conventional bicycle water bottle is mounted in a carrier attached to the down tube or seat tube of the frame. A conventional tool containing pouch is mounted to the frame behind the rider's seat. Typically, the water bottle or tool pouch profile extends well outside the envelope of the bicycle frame, when viewed head on, and thus adds to the frontal area of the bicycle increasing the aerodynamic drag on the bicycle. Further, the shape of the tool pouch or water bottle disturbs the air flowing across the bicycle frame members, thus further adding to the overall drag of the bicycle.

SUMMARY OF INVENTION

Accordingly, it is an object of the present invention at least to partially overcome the disadvantages of the prior art. Also, it is an object of the invention to provide an improved storage element and frame in order to reduce aerodynamic drag.

In the field of bicycle design and racing, aerodynamics plays an important role. Bicycles are now being designed to further reduce any aerodynamic drag to give the rider a further advantage over competitors or to improve their own times.

The present invention is directed to a storage element and bicycle frame that work in conjunction with each other. Bicycles made in the past have been designed in an aerodynamic fashion to reduce aerodynamic drag. As well, some storage elements, for example water bottles, have been designed to also be aerodynamic in shape. However, it is an object of the present invention to make both the frame and storage element as aerodynamic as possible when the storage element is attached to the frame. The storage element is designed to function as an integral aerodynamic element of the frame.

In general, a bicycle frame has a top tube, down tube, seat tube and head tube.

In a first embodiment, the storage element may complete an aerodynamic design between the down tube and the seat tube. When viewed in section, the storage element complements the frame tube profiles to present an optimal aerodynamic form, effectively smoothing out the airflow across the down tube and seat tube. The net result is a reduction in aerodynamic drag on the frame. It is the exposed portions of the storage element together with the exposed portions of the down tube and the seat tube which form an aerodynamic shape. In this embodiment, the down tube is the first part of an aerodynamic shape and the seat tube is the last part of an aerodynamic shape. The storage element would then fit between the seat tube and down tube to complete an aerodynamic shape for optimal aerodynamic design.

The aerodynamic shape of the bicycle frame in combination with the storage element is selected to be a shape that assists in reducing the aerodynamic drag when the bicycle moves forwardly through the air. Preferably, this may be an oval shape. Furthermore the oval shape may be a teardrop shape. A teardrop shape essentially has an enlarged rounded forward end and a reduced size at the rear end.

The storage element and frame may also be designed with a drinking straw which is routed internally through the frame. In this embodiment, the storage element is designed to be a refillable container such as a water bottle for the storage of fluids for consumption by the rider. The drinking straw may allow the rider to drink from the storage element without removing the storage element from the frame itself. An advantage of a drinking straw is that it allows the rider to drink, without breaking from their aerodynamic position on the bicycle, as is necessitated by a removable waterbottle.

In one embodiment, the storage element may continue the aerodynamic design of the down tube of the bicycle frame without being attached to the seat tube. In this way, the storage element actually increases the aerodynamic design of the frame. In this instance, the down tube may be the first part of an aerodynamic shape and the storage element may complete the aerodynamic shape. The down tube is designed to accept the storage element and the other tubes can be individually made to be aerodynamic.

In another embodiment, the storage element may be attached to the seat tube without also being attached to the down tube. In this instance, the storage element can be designed as the first part of an aerodynamic shape and the seat tube can be the remaining part of the aerodynamic shape. In this instance, the seat tube is designed to accept the storage element and the other tubes can be individually made to be aerodynamic.

In another element, the storage element may be attached in a junction between the top tube and the seat tube. In this instance, the storage element can be designed as the first part of an aerodynamic shape and the seat tube can be designed to be the remaining part of the aerodynamic shape. The seat tube and top tube are designed to accept the storage element and the other tubes can be individually made to be aerodynamic.

In still another embodiment, the storage element may be attached in a junction between at least two of the top tube, head tube and down tube. In this instance, the head tube and down tube can be designed as the first part of an aerodynamic shape and the storage element can be designed to be the remaining part of the aerodynamic shape. The head tube, down tube and top tube are all designed to accept the storage element and the other tubes can be individually made to be aerodynamic.

The storage element and frame may also be designed to facilitate the attachment of the storage element to the frame. In an embodiment of the invention, the storage element has concealed portions of its exterior surface when attached to the frame. The concealed portions have complementary mating shapes to the concealed exterior portions of the exterior surface to the tube of the frame. These mating shapes prevent the storage element from moving normal to the plane of the frame and from falling off the bicycle.

In a still further aspect, the concealed portions of the exterior surface of the tubes are convexly shaped and the concealed exterior portions of the storage element include a channel to receive the convexly shaped portions of the tubes.

In a further aspect, the concealed portions of the exterior surface of the storage element are convexly shaped and the concealed portions of the exterior surface of the tubes include a channel to receive the convexly shaped portions of the storage element.

In a further aspect, the exterior surfaces of the tubes have a cross-section normal to the plane of the tubes which is a teardrop shape and the storage element is designed with channels to receive the teardrop shaped portions of the tubes.

In a further aspect, the storage element has an interior storage compartment. The interior storage compartment can be adapted to store any manner of items, including water, food, bicycle repair tools, collapsed inflatable bicycle tire replacement inner tubes, inner tube inflation devices, eyeglasses, goggles, clothing, maps and other items. The interior storage compartment can be configured to be accessible to the rider of the bicycle while the rider is riding the bicycle although it is not necessary, for example, when the compartment needs merely be accessible as when used for storing tools.

The storage element may also be a refillable container such as a water bottle for the storage of fluids for consumption by the rider.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

in FIG. 3

FIG. 15 illustrates the second frame embodiment with a storage element mounted to the seat tube.

FIG. 16 illustrates a cross-section of the seat tube and storage element along Section A-A in FIG. 15.

FIG. 17 illustrates a cross-section of the top end of the seat tube along Section B-B in FIG. 15.

FIG. 18 illustrates a cross-section of the lower end of the seat tube along Section C-C of FIG. 15.

FIG. 19 is a side view of the frame of FIG. 15 with a drinking straw routed internally from the storage element through the seat tube and top tube.

FIG. 20 is a cross-section along D-D in FIG. 19.

DETAILED DESCRIPTION OF THE PREFERRED EMBODIMENTS

Preferred embodiments of the invention and its advantages can be understood by referring to the present drawings. Through all of the drawings the same reference numbers are used to refer to similar elements.

Figure 1:
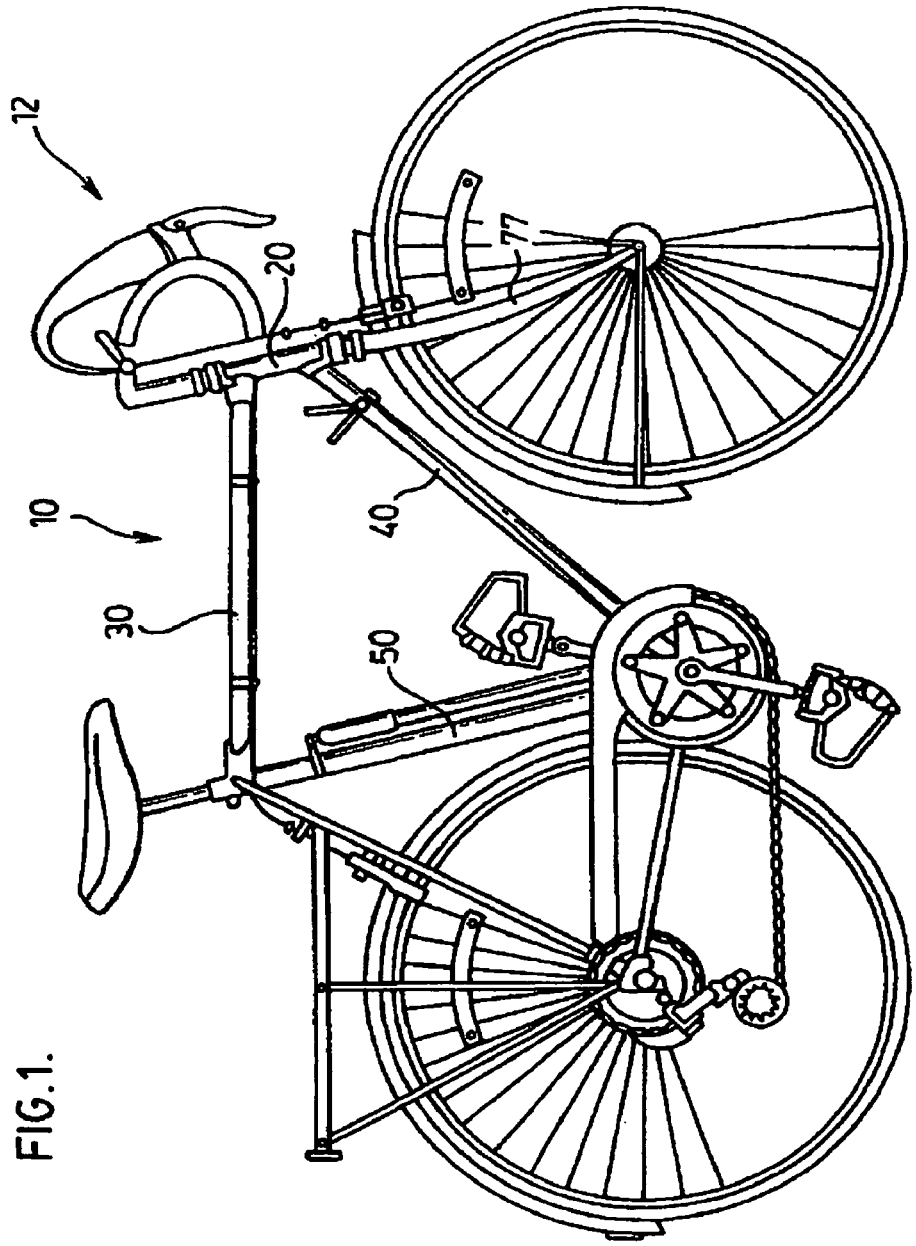
FIG. 1 is a side view of a conventional bicycle.
Figure 2:
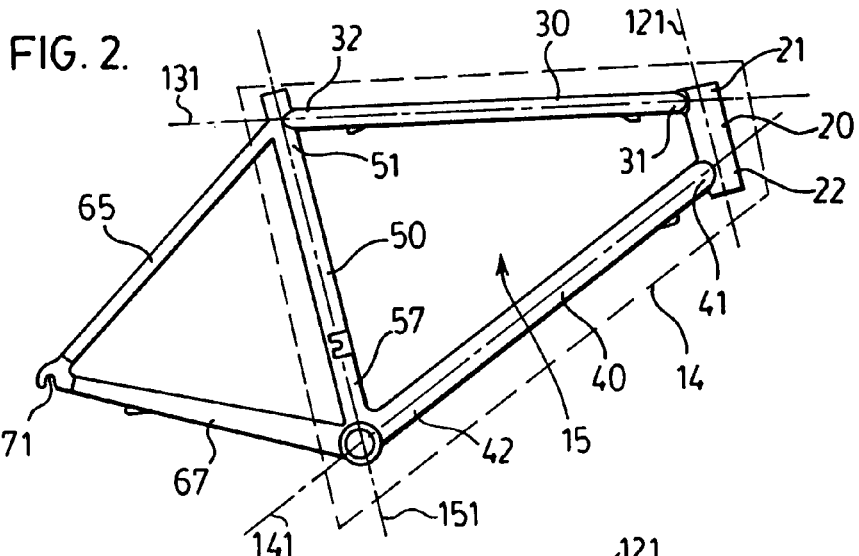
FIG. 2 is a side view of a first frame embodiment.

FIG. 1 is a side view of a bicycle 12 in accordance with a first embodiment of the invention. The bicycle 12 has a frame 10 comprising a head tube 20, a top tube 30, a down tube 40 and a seat tube 50. The bicycle 12, when in normal use, moves in a forward direction where the head tube 20 and down tube 40 are forward of the seat tube 50. The top tube generally extends in forward direction. Each of the head tube 20, top tube 30, down tube 40 and seat tube 50 is connected end-to-end to one another and form substantially a closed main frame loop 14 and a central cavity 15 as shown in FIG. 2. The central cavity 15 is the area enclosed by the main frame loop 14.

A fork 77 is rotatably coupled to the head tube 20 to extend through the head tube carrying at an upper end to the handlebars.

The bicycle frame 10 as best seen in FIG. 2, the frame 10 has a head tube 20, a top tube 30, a down tube 40, and a seat tube 50. The head tube 20 has a top end 21 and a lower end 22. The top tube 30 has a front end 31 and a rear end 32. The down tube has a front end 41 and a rear end 42. The seat tube 50 has a top end 51 and a lower end 57.

The front end 31 of the top tube 30 is connected to the top end 21 of the head tube 20. The front end 41 of the down tube 40 is connected to the lower end 22 of the head tube 20. The top tube 30 and down tube 40 diverge away from each other as they extend rearwardly from the head tube 20. The rear end 42 of the down tube 40 is coupled to the lower end 57 of the seat tube 50. The rear end 32 of the top tube 30 is connected to the top end 51 of the seat tube 51.

Each of the head tube 20, top tube 30, down tube 40 and seat tube 50 are elongate members disposed about their own longitudinal axis indicated as 121, 131, 141 and 151 respectively. The longitudinal axis of each of the head tube 20, top tube 30, down tube 40 and seat tube 50 lie in the same flat central plane illustrated in FIGS. 4 to 8 and 10 as 92. Thus, mainframe loop 14 is disposed about and lies centred on the flat central plane 92.

Each of the head tube 20, top tube 30, down tube 40 and seat tube 50 are generally symmetrical about the central plane 92. Each of these tubes have an annular tubular wall with an external surface which is symmetrical about the central plane 92. Each of these tubes 20, 30, 40 and 50 has inwardly directed portions of its exterior surface facing the central cavity 15 with the mainframe loop 14.

Figure 3:
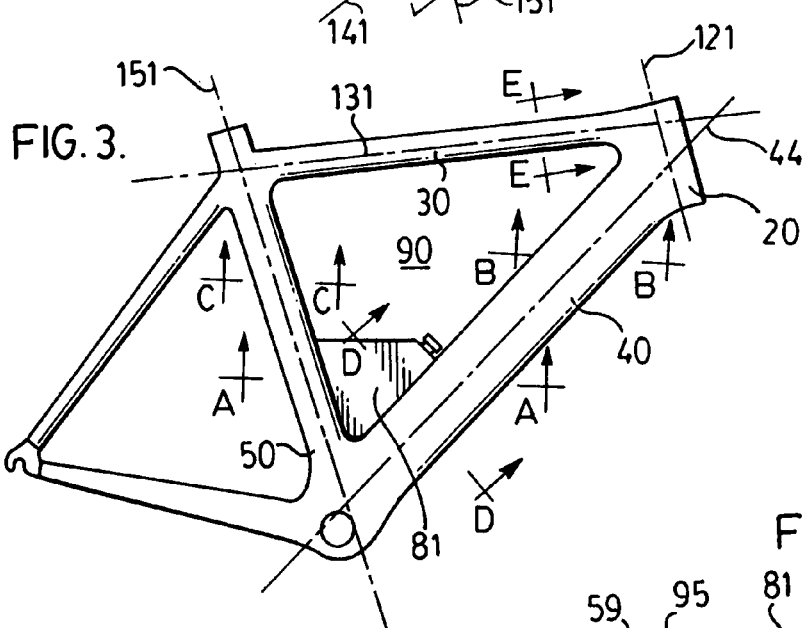
FIG. 3 illustrates a second frame embodiment with a storage element disposed between the down tube and the seat tube.

FIG. 3 is a preferred second embodiment of the frame 10 and storage element 81. FIG. 3 is a side view of a bicycle frame 10 with the storage element 81 attached between the down tube 40 and seat tube 50. As can be seen from FIG. 3, the storage element 81 completes the space between the down tube 40 and the seat tube 50. This design allows the air to flow around the down tube 40, storage element 81 & seat tube 50, in a relatively undisturbed manner. The storage element 81 effectively creates one aerodynamic component which includes the down tube 40, the storage element 81 and the seat tube 50.

Figure 4:
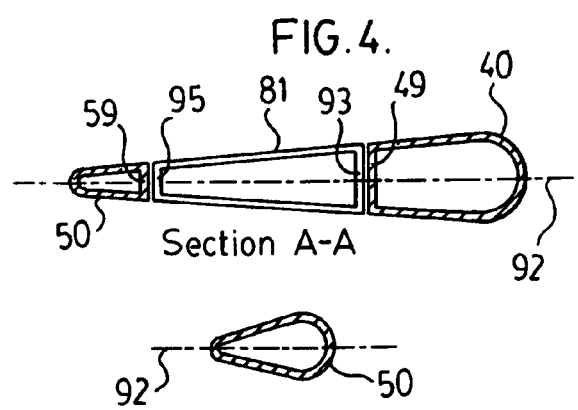
FIG. 4 is a cross section of FIG. 3 along A-A in FIG. 3 illustrating the aerodynamic design of the down tube, storage element and seat tube.

FIG. 4 is a cross-section along Section A-A shown in FIG. 3. As shown in FIG. 4, the down tube 40, storage element 81 and the seat tube 50 together form an aerodynamic shape. The down tube 40 is the front of the aerodynamic shape and the seat tube 50 is the back of the aerodynamic shape. The down tube 40 has a rounded front portion and the seat tube 50 has a rounded rear portion. The rounded front portion of the down tube 40 extends further away from the central plane than the rounded rear portion of the seat tube 50. FIG. 4 also shows both the down tube 40 and the seat tube 50 with straight portions that are symmetrical about the central plane 92. The storage element 81 also has straight portions which are symmetrical about the central plane 92 and together with the straight portions of the down tube 40 and seat tube 50 form continuous straight portions symmetrical about the central plane 92. The rounded front portion of the down tube 40 and the rounded rear portion of the seat tube 50 in combination with the storage element 81 show a teardrop shape. The teardrop shape is formed because the rounded portion at the front of down tube 40 extends further from the central plane 92 than the rear portion of seat tube 50 and the sides of the down tube, storage element and seat tube gradually reduces in width from the front of the down tube to the rear seat tube.

When the bicycle with the storage element attached moves in the forward direction, portions of the storage element 81 and the bicycle frame 10 will be concealed from the airflow that is parallel to the central plane. FIG. 4 shows an exterior surface of the down tube 40 with a rounded front portion that is directed away from the central cavity 15 and a concealed portion 49 which is directed inwardly towards the central cavity 15. The concealed portion 49 is straight and intersects the central plane 92. An exterior surface of the seat tube 50 is also shown with a rounded rear portion that is directed away from the central cavity 15 and a concealed portion 59 which is directed inwardly towards the central cavity 15. The concealed portion 59 is straight and intersects the central plane 92. The storage element 81 has an exterior surface with concealed portions 93 and 95 which are adjacent and conceal the inwardly directed concealed portions 49 and 59, respectively. It is the exposed portions of the down tube 40, storage element 81 and the seat tube 50 which form the aerodynamic shape.

Although not shown, the storage element 81 may be held in place on the frame 10 by a number of non-permanent fastening means. For example, the concealed portions 93 and 49 and/or 95 and 59 may have complementary mating shapes to hold the storage element 81 on the frame 10.

Figure 5:
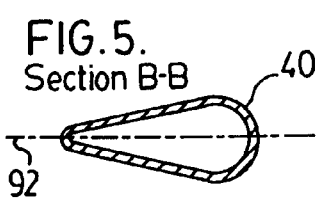
FIG. 5 is a cross section of FIG. 3 along B-B of in FIG. 3 illustrating the general aerodynamic design of the down tube.

FIG. 5 is a cross-section along Section B-B shown in FIG. 3. FIG. 5 shows the down tube 40 where the storage element is not attached as having an aerodynamic teardrop shape.

Figure 6:
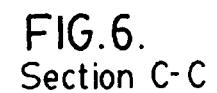
FIG. 6 is a cross section of FIG. 3 along C-C in FIG. 3 illustrating the general aerodynamic design of the seat tube.

FIG. 6 is a cross-section along Section C-C shown in FIG. 3. FIG. 6 shows the seat tube 50 where the storage element is not attached as having an aerodynamic teardrop shape.

Figure 7:
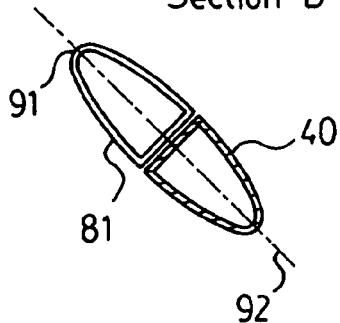
FIG. 7 is a cross-section of FIG. 3 along D-D.

FIG. 7 is a cross-section along Section D-D shown in FIG. 3. FIG. 7 illustrates a design of the storage element showing a curved top 91 on the storage element.

Figure 8:
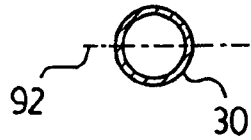
FIG. 8 is a cross-section of FIG. 3 along E-E in FIG. 3

FIG. 8 is a cross-section along E-E shown in FIG. 3. FIG. 8 shows the top tube 30 having a circumferential wall about the longitudinal axis and the wall being symmetrical about the central plane 92.

Figure 9:
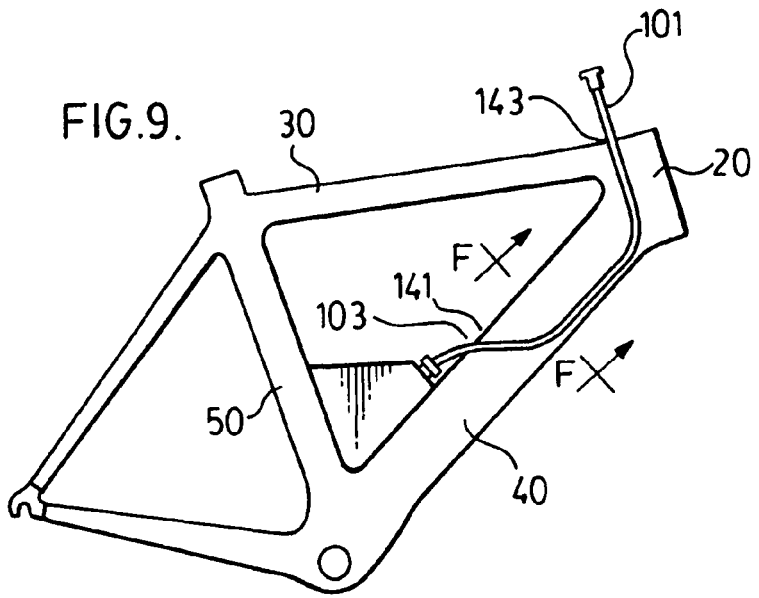
FIG. 9 is a schematic side view of the frame of FIG. 3 with a drinking straw routed internally from the storage element through the down tube.
Figure 10:
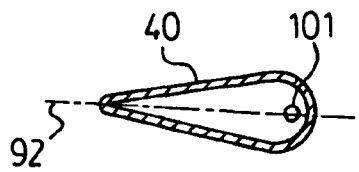
FIG. 10 is a cross-section of FIG. 9 along F-F in FIG. 9

FIG. 9 illustrates the storage element 81 as a water bottle held between the down tube 40 and seat tube 50 as shown in FIG. 3 but further schematically shows a drinking straw 101 routed internally through the frame of the down tube 40 as seen in cross-section in FIG. 10. In this instance, the down tube 40 is provided with an entrance opening 141 that allows the straw 101 to enter the down tube. Drinking straw guides 103 may be provided in the entrance opening 141. These guides 103 may be a grommet or other suitable means to assist the drinking straw 101 through the opening 141. The straw extends internally through the down tube 40 to the head tube 20, internally through the head tube 20 to the top tube 30 and exiting the top tube 30 at an exit opening 143 near the rider's head.

FIG. 10 is a cross-section along Section F-F shown in FIG. 9. FIG. 10 shows the drinking straw 101 routed inside the down tube 40.

Figure 11:
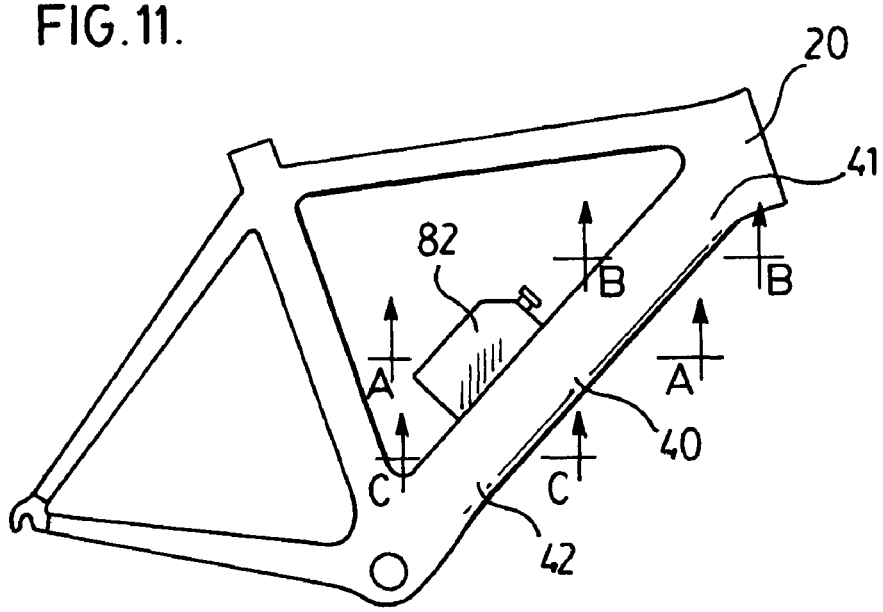
FIG. 11 illustrates the second frame embodiment with a storage element mounted to the down tube.
Figure 12:
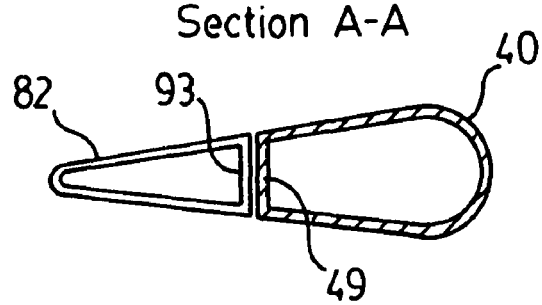
FIG. 12 illustrates a cross-section of the down tube and storage element along Section A-A in FIG. 11.

FIG. 11 shows an alternate embodiment of the frame 10 and a storage element 82 with the storage element 82 attached to the down tube 40 only. This allows the air to flow around the down tube 40 and the storage element 82. The storage element 82 and down tube 40 together effectively creates one aerodynamic component. As seen in FIG. 12, which is a is a cross-section along Section A-A shown in FIG. 11, the down tube 40 is the front portion of an aerodynamic teardrop shape and the storage element 82 is the rear portion of the aerodynamic teardrop shape.

Figure 13:
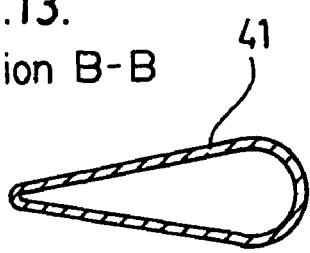
FIG. 13 illustrates a cross-section of the front end of the down tube along Section B-B in FIG. 11.

FIG. 13 is a cross-section along Section B-B shown in FIG. 11. FIG. 13 shows that the down tube 40 between the storage element 82 and the front end 41 of the down tube 40 has an aerodynamic teardrop shape.

Figure 14:
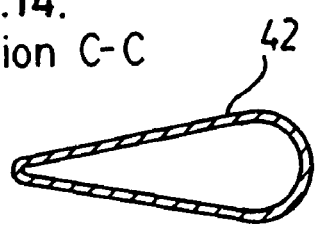
FIG. 14 illustrates a cross-section of the rear end of the down tube along Section C-C in FIG. 11.

FIG. 14 is a cross-section along Section C-C shown in FIG. 11. FIG. 14 shows the down tube 40 between the storage element 82 and the rear end 42 of the down tube 40, where the storage element is not attached, has an aerodynamic teardrop shape.

FIG. 15 is an alternate embodiment of the frame 10 and a storage element 83 with the storage element 83 attached to the seat tube 50 only. This allows the air to flow around the storage element 83 and the seat tube 50. The storage element 83 effectively creates one aerodynamic component which includes the seat tube 50 and the storage element 83.

FIG. 16 is a cross-section along Section A-A shown in FIG. 15. FIG. 16 shows the storage element 83 is the front portion of an aerodynamic teardrop shape and the seat tube 50 is the rear portion of the aerodynamic teardrop shape. As can be seen in FIG. 16, the concealed portion 59 of the exterior surface of the seat tube 50 contacts the concealed portion 95 of the storage element 83.

FIG. 17 is a cross-section along Section B-B shown in FIG. 15. FIG. 17 shows the seat tube more between the storage element 83 and the top end 51 of the seat tube 50, where the storage element is not attached, as having an aerodynamic teardrop shape.

FIG. 18 is a cross-section along Section C-C shown in FIG. 15. FIG. 18 shows the seat tube between the storage element 83 and the lower end 57 of the seat tube 50, where the storage element is not attached, as having an aerodynamic teardrop shape.

FIG. 19 illustrates the storage element 83 as a water bottle held on the seat tube 50 as shown in FIG. 15 but further schematically a drinking straw 101 routed internally through the frame of the seat tube 50 and top tube 30. The seat tube is schematically shown as having an entrance opening 151 that allow the straw to enter the seat tube 30. The straw 101 travels internally through the seat tube, top tube 30 and exit the top tube near the rider's head. As shown in FIG. 19, the drinking straw 101 may exit the top tube or the head tube 20 at exit opening 143 of the bicycle frame.

FIG. 20 is a cross-section along Section D-D shown in FIG. 19. FIG. 20 shows the drinking straw 101 routed inside the top tube 30.

Figure 21:
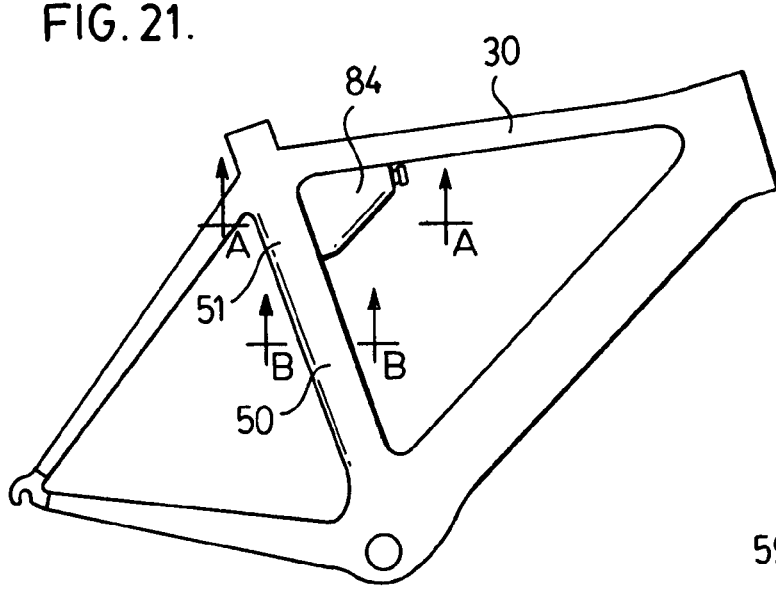
FIG. 21 illustrates the second frame embodiment with a storage element disposed between the top tube and the seat tube.

FIG. 21 shows an additional embodiment of the frame and storage element. FIG. 21 is a side view of a bicycle frame with the storage element attached between the top tube 30 and seat tube 50. As can be seen from FIG. 21, the storage element 84 completes the space between the top tube 30 and the seat tube 50 allowing air to flow around the storage element 84 and the seat tube 50. The storage element 84 effectively creates one aerodynamic component which includes the seat tube 50.

Figure 22:
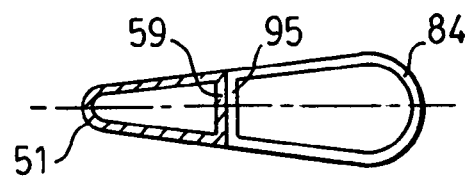
FIG. 22 is a cross section along A-A in FIG. 21 illustrating the aerodynamic design of the storage element and the seat tube.

FIG. 22 is a cross-section along Section A-A shown in FIG. 21. FIG. 22 illustrates a design wherein the storage element 84 is the start of an aerodynamic teardrop shape and the seat tube 50 is the end of the aerodynamic teardrop shape. In this embodiment, it is the top end 51 of the seat tube 50 which completes the aerodynamic shape. As can be seen in FIG. 22, the concealed portion 59 of the exterior surface of the seat tube 50 contacts the concealed portion 95 of the storage element 83.

Figure 23:
FIG. 23 is a cross section along B-B in FIG. 21 illustrating the aerodynamic design of the seat tube.

FIG. 23 is a cross-section along Section B-B shown in FIG. 21. FIG. 23 illustrates a design wherein the seat tube at a lower end, where the storage element is not attached, has an aerodynamic teardrop shape.

Figure 24:
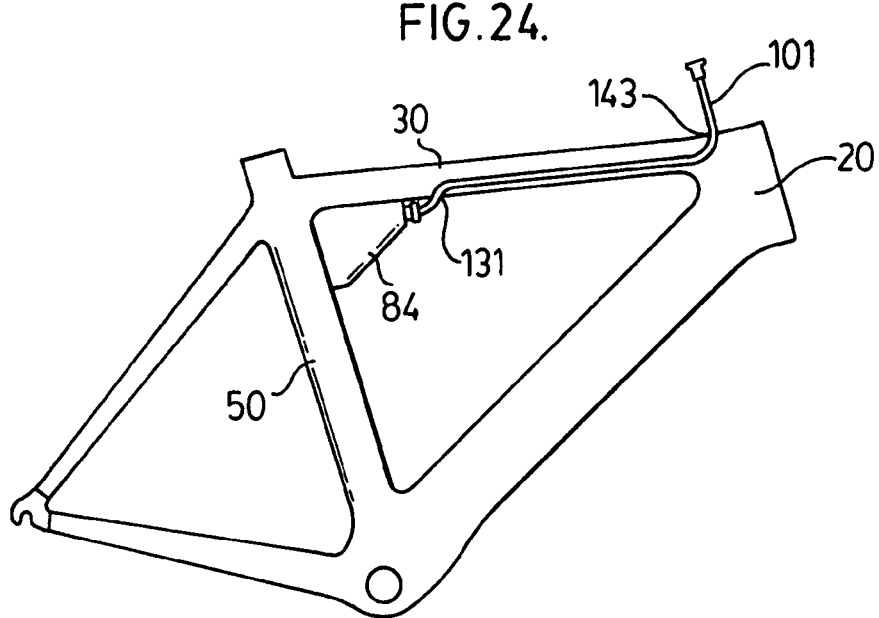
FIG. 24 is a side view of the frame of FIG. 21 with a drinking straw routed internally from the storage element through the top tube.

FIG. 24 illustrates the storage element 84 as a water bottle held between the top tube 30 and seat tube 50 as shown in FIG. 21 but further includes a drinking straw 101 which can be routed internally through the frame in the top tube 30. In this instance, the top tube 30 is provided with an opening 131 and drinking straw guides (not shown) that allow the straw to enter the top tube 30 and exit the top tube in a location, which allows the rider to conveniently drink from the straw. As shown in FIG. 24, the drinking straw may exit the top tube 30 or the head tube 20 at exit opening 143 of the bicycle frame 10.

Figure 25:
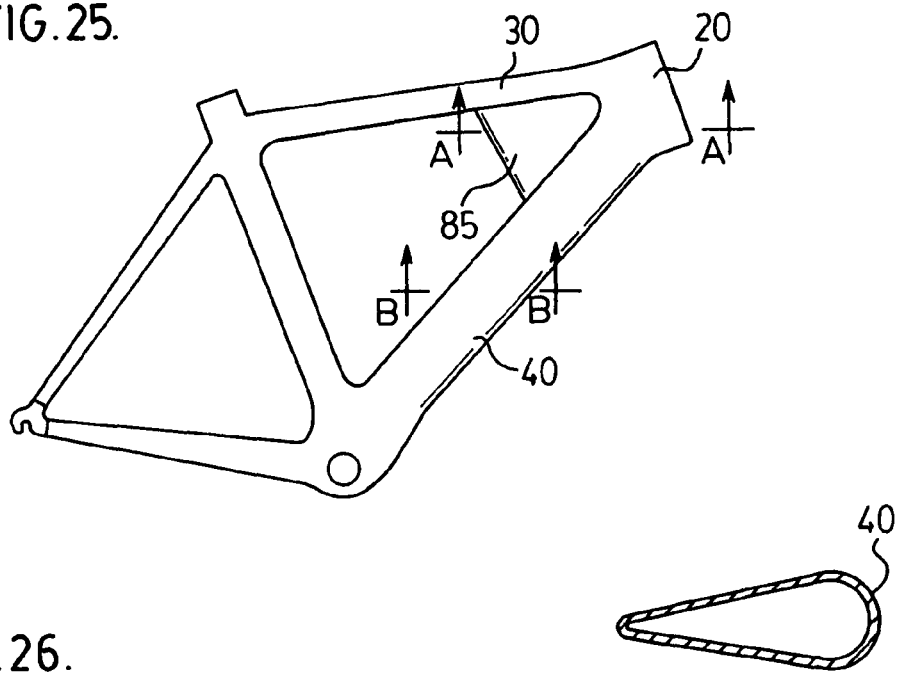
FIG. 25 illustrates the second frame embodiment with a storage element disposed between the top tube, head tube and the down tube.

FIG. 25 is an additional embodiment of the frame 10 and storage element 85. FIG. 25 is a side view of a bicycle frame with the storage element 85 attached between the top tube 30, head tube 20 and down tube 40. As can be seen from FIG. 25, the storage element 85 completes the space between the top tube 30 and the down tube 40. This design allows the air to flow around the head tube 20 and the down tube 40 and then around the storage element 85. The storage element 85 effectively creates an aerodynamic component which includes the down tube 40 and head tube 20.

Figure 26:
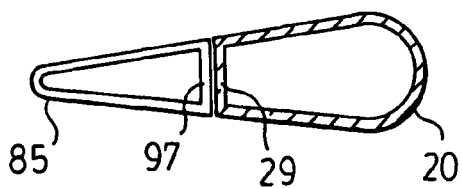
FIG. 26 is a cross section along A-A in FIG. 25 illustrating the aerodynamic design of the storage element, the down tube and the head tube.

FIG. 26 is a cross-section along Section A-A shown in FIG. 25. FIG. 26 illustrates a design wherein the head tube 20 and/or down tube 40 is the start of an aerodynamic teardrop shape and the storage element is the end of the aerodynamic teardrop shape. As can be seen in FIG. 26, the concealed portion 29 of the exterior surface of the head tube 20 contacts the concealed portion 97 of the storage element 85.

Figure 27:
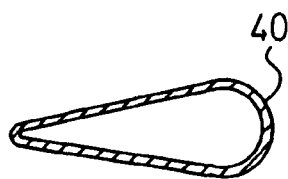
FIG. 27 is a cross section along B-B in FIG. 25 illustrating the aerodynamic design of the down tube.

FIG. 27 is a cross-section along Section B-B shown in FIG. 25. FIG. 27 illustrates a design wherein the down tube at a rear end, where the storage element is not attached, has an aerodynamic teardrop shape.

Figure 28:
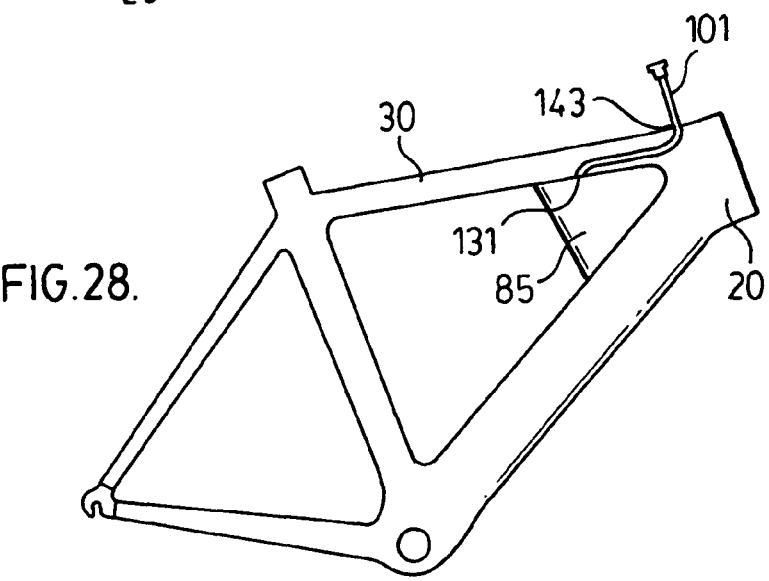
FIG. 28 is a side view of the frame of FIG. 25 with a drinking straw routed internally from the storage element through the top tube.

FIG. 28 illustrates the storage element 85 as a water bottle held between the top tube 30, head tube 20 and down tube 40 as shown in FIG. 25 but further includes a drinking straw 101 which can be routed internally through the frame in the top tube 30. In this instance, the top tube 30 is provided with an opening 131 and drinking straw guides (not shown) that allow the straw to enter the top tube 30 and exit the top tube at in a location, which allows the rider to conveniently drink from the straw. As shown in FIG. 28, the drinking straw may exit the top tube 30 at exit 143 of the bicycle frame 10.

Figure 29:
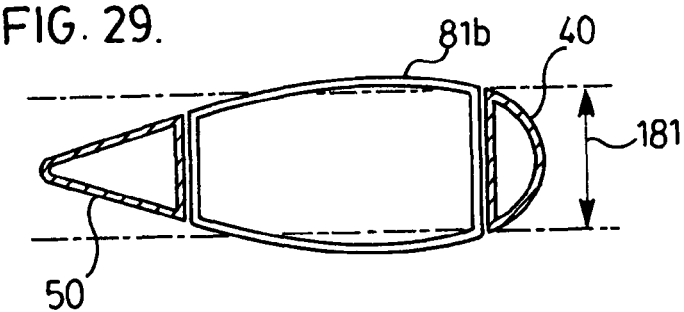
FIG. 29 is a cross sectional top view similar to that of FIG. 4 but of a second embodiment of the storage element when disposed between the down tube and seat tube.

FIG. 29 is a cross-section along Section A-A shown in FIG. 3 illustrating an additional embodiment of the storage element 81. In this embodiment, the storage element 81$b$ is extended laterally beyond the envelope 181 of the frame. Even though the storage element 81$b$ extends outside the envelope of the frame the resulting combined profile of the tubes and storage element 81 results in a net reduction of aerodynamic drag on the bicycle frame 10.

The storage element can be designed to incorporate the means to attach itself to the bicycle frame. Furthermore, the bicycle frames can be designed to incorporate a means to attach the storage element.

Figure 30:
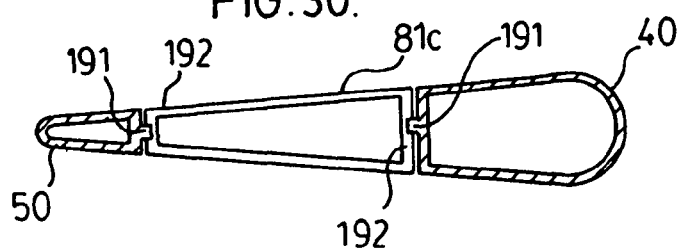
FIG. 30 is a cross sectional top view similar to that of FIG. 4 but of a third embodiment of the storage element when disposed between the down tube and seat tube.

FIG. 30 is a cross-section along Section A-A shown in FIG. 3 illustrating an additional embodiment of the storage element 81 and the bicycle frame 10. As shown in FIG. 30, the storage element 81$c$ and the bicycle frame are provided with complementary mating shapes 191 and 192 on the concealed portions of both the storage element and the bicycle frame. The storage element can, therefore, be easily attached to the frame while still allowing easy access and removal.

Figure 31:
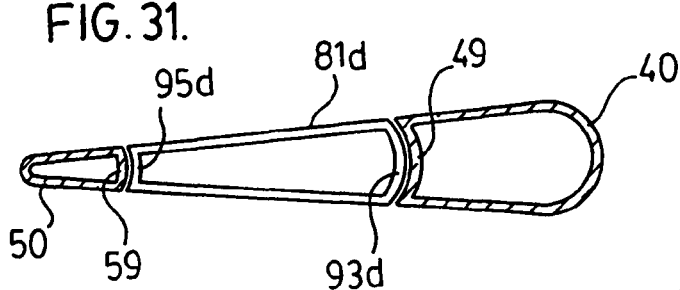
FIG. 31 is a cross sectional top view similar to that of FIG. 4 but of a fourth embodiment of the storage element when disposed between the down tube and seat tube.

FIG. 31 is a cross-section along Section A-A shown in FIG. 3. FIG. 31 illustrates an additional embodiment of the storage element 81 and the bicycle frame 10. As shown in FIG. 31, the concealed portion 93$d$ of the exterior surface of the storage element 81$d$ which contacts the down tube 40 is convexly shaped and the concealed portion 95$d$ of the exterior surface of the storage element 81$d$ which contacts the seat tube 50 is concavely shaped. Furthermore, the concealed portions 49 of the exterior surface of the down tube 40 are concavely shaped to receive the convexly shaped portion of the storage element 81d and the concealed portions 59 of the seat tube are convexly shaped to receive the concavely shaped portion of the storage element 81d.

Figure 32:
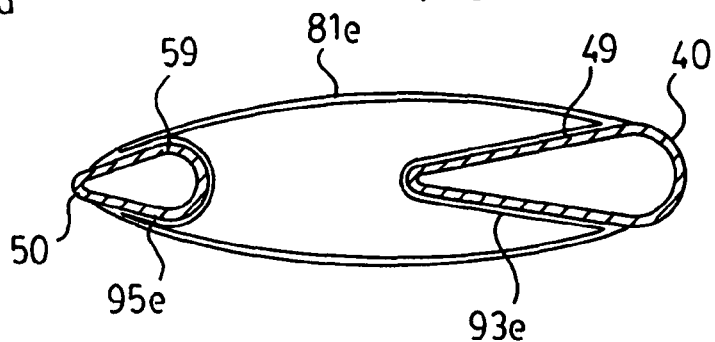
FIG. 32 is a cross sectional top view similar to that of FIG. 4 but of a fifth embodiment of the storage element when disposed between the down tube and seat tube.

FIG. 32 is a cross-section along Section A-A shown in FIG. 3. FIG. 32 illustrates a still additional embodiment of the storage element 81 and the bicycle frame 10. As shown in FIG. 32, the concealed portion 93e of the exterior surface of the storage element 81e which contacts the down tube 40 is concavely shaped and the concealed portion 95e of the exterior surface of the storage element 81e which contacts the seat tube 50 is also concavely shaped. Furthermore, the concealed portions 49 of the exterior surface of the down tube and the concealed portions 59 of the exterior surface of the seat tube are convexly shaped to receive the concavely shaped portions 93e, 95e of the storage element 81e.

Figure 33:
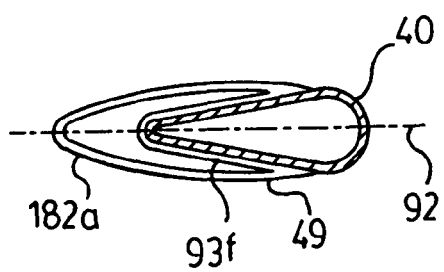
FIG. 33 is a cross section top view similar to that of FIG. 11 but of an additional embodiment of the storage element when attached to the down tube.

FIG. 33 is a cross-section along Section A-A in FIG. 11. FIG. 33 shows an additional embodiment of the storage element 82 and the bicycle frame 10. As shown in FIG. 33, the concealed portion 93f of the exterior surface of the storage element 82a which contacts the down tube 40 is concavely shaped. The concealed portion 49 at the exterior surface of the down tube is convexly shaped to receive the concavely shaped portion 93 of the storage element 82a.

The storage element 81f also extends a longer distance from the central plane 92 than the forward portion of the down tube 40. This allows the storage element 82a to store a greater volume and still maintain an aerodynamic shape.

Figure 34:
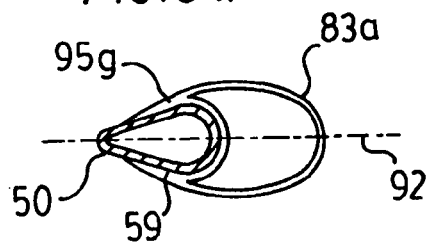
FIG. 34 is a cross section top view similar to that of FIG. 11 but of an additional embodiment of the storage element when attached to the seat tube.

FIG. 34 is a cross-section along Section A-A in FIG. 15. FIG. 33 shows an additional embodiment of the storage element 83a and the bicycle frame 10. As shown in FIG. 33, the concealed portion 95g of the exterior surface of the storage element 83a which contacts the seat tube 50 is concavely shaped. The concealed portion 59 at the exterior surface of the down tube is convexly shaped to receive the concavely shaped portion 95g of the storage element 83a.

The storage element 83a also extends a longer distance from the central plane 92 than any portion of the seat tube 50. This allows the storage element 83a to store a greater volume and still maintain an aerodynamic shape.

Figure 35:
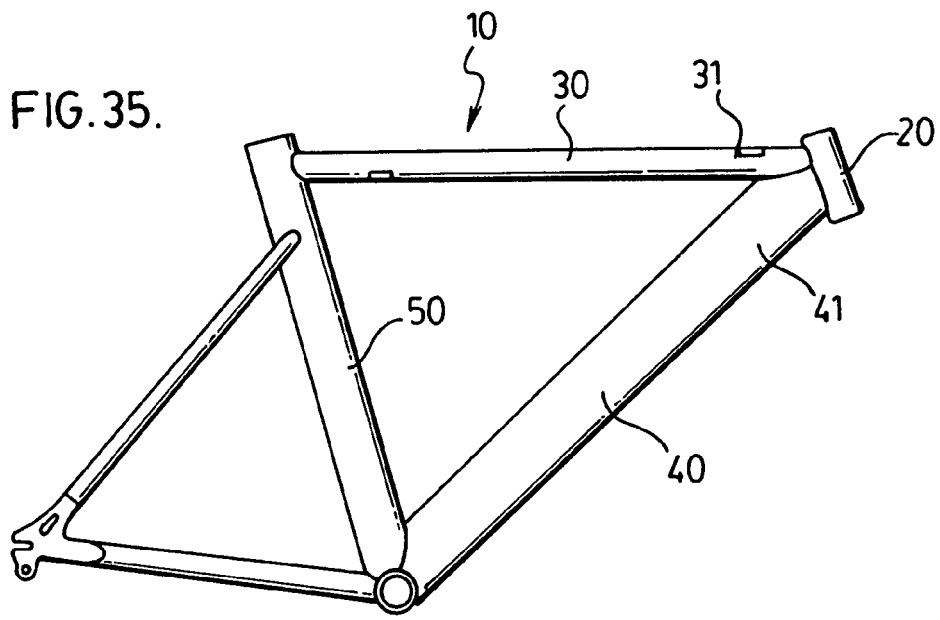
FIG. 35 is a side view of a third frame embodiment.

FIG. 35 is a third embodiment of the bicycle frame where the front end 31 of the top tube 30 is connected directly with the front end 41 of the down tube 40. In this embodiment the head tube 20 does not form a side of the main frame loop 14.

Figure 36:
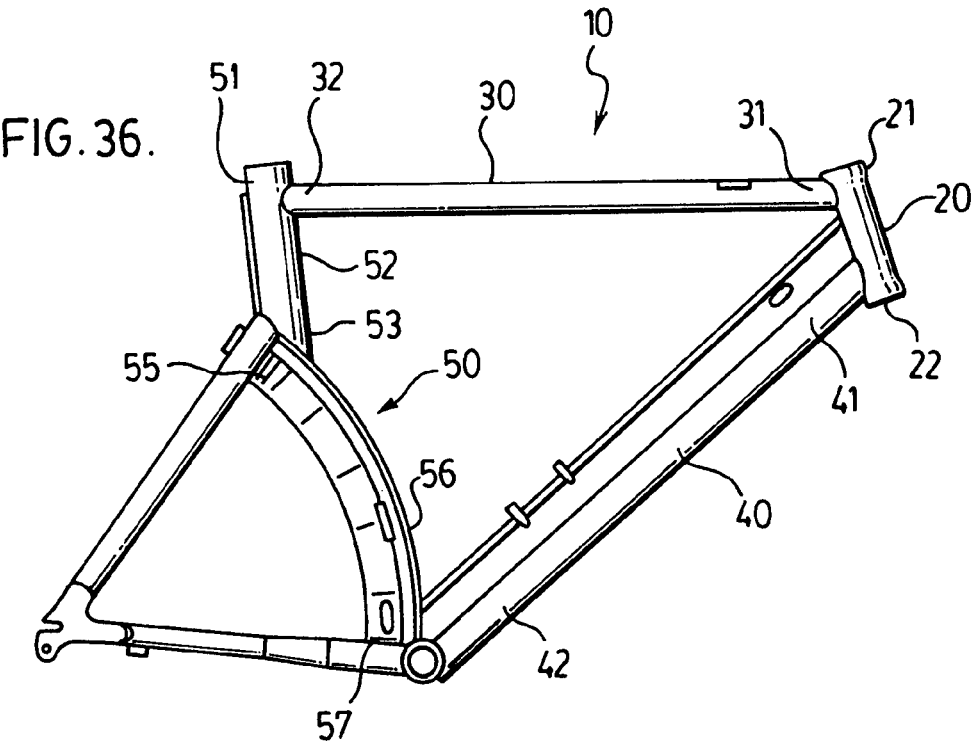
FIG. 36 is a side view of a fourth frame embodiment.

FIG. 36 is a fourth embodiment of the bicycle frame showing the seat tube 50 that is non-linear which has two-parts. The seat tube 50 may be designed in a similar manner to further increase the aerodynamics of the bicycle. The seat tube has an upper tubular portion 52 which has the upper end 51 and a lower end 53; and a lower tubular portion 56 which has an upper end 55 and the lower end 57. As shown there is an apex between the upper tubular portion 52 and the lower tubular portion 56.

Figure 37:
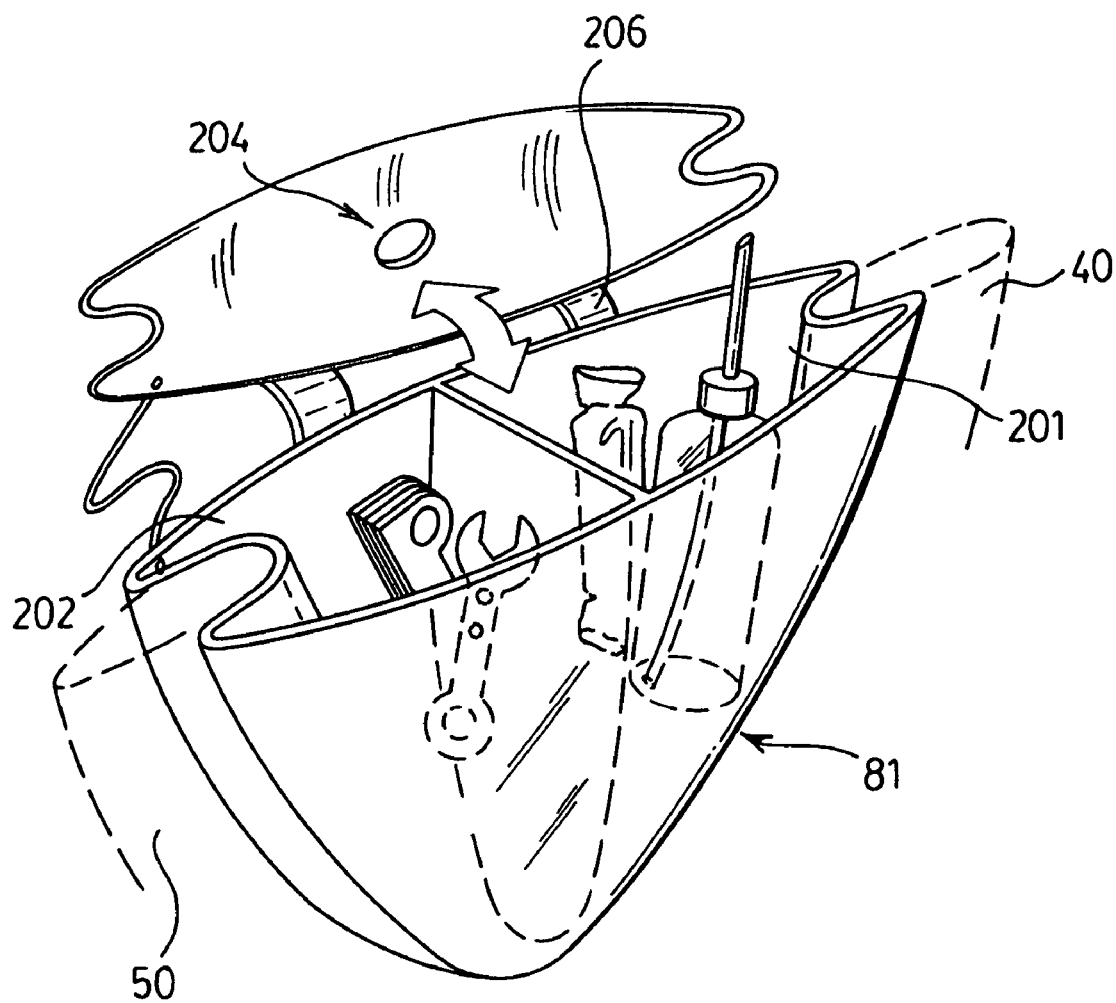
FIG. 37 is a schematic pictorial view of a storage element, incorporating dividers, to facilitate the storage of tools, food and beverages.

FIG. 37 is a perspective pictorial view of the storage element attached between the down tube 40 and the seat tube 50 and is similar to FIG. 32. As shown in FIG. 35, the storage element 81 may have separate compartments 201 and 202. The separate compartments 201 and 202 may be separated by a flat hard surface that extends from the bottom to the top of the storage element 81. The first compartment could hold food while the second compartment could hold rider tools. The storage element 81 may be provide with a cover 204 that allows the rider to access the storage element while continuing to ride the bicycle. The cover 204 can be designed to snap onto the top of the storage element and may be provided with an aerodynamic top to further improve the aerodynamics of the storage element 81. The cover 204 may be attached to the storage element 81 by straps 206.

While the invention will be described in conjunction with the illustrated embodiments, it is understood that it is not intended to limit the invention to such embodiments. On the contrary, it is intended to cover all alternatives, modifications and equivalents as may be included within the spirit and scope of the invention as defined by the following claims.

The invention claimed is:

1. A bicycle frame comprising:
    a top tube with a front end and a rear end,
    a head tube with a top end and a lower end,
    a down tube with a front end and a rear end,
    a seat tube with a top end and lower end,
    the front end of the top tube connected to the top end of the head tube,
    the front end of the down tube connected to the lower end of the head tube,
    the top tube and down tube diverging away from each other as the top tube and the down tube extend rearwardly from the head tube,
    the rear end of the down tube coupled to the lower end of the seat tube,
    the rear end of the top tube top connected to the top end of the seat tube,
    the top tube, head tube, down tube and seat tube substantially forming a closed main frame loop about a hollow central cavity,
    the head tube adapted to be coupled to a pivotable front fork which carries a front wheel and handlebars,
    the top tube, head tube, down tube, and seat tube each comprises a tubular member extending about a respective longitudinal axis,
    the longitudinal axis each of the top tube, head tube, down tube, and seat tube lies in a flat longitudinal central plane,
    the frame in normal use in a bicycle is adapted to be moved in a forward direction with the head tube and down tube forward of the seat tube and the top tube extending generally in the forward direction,
    the each tubular member having a circumferential wall about its respective longitudinal axis with the circumferential wall having an exterior surface generally symmetrical about the central plane,
    the each tubular member having inwardly directed portions of its exterior surface facing the central cavity,
    a storage element disposed within the central cavity coupled to the frame,
    the storage element having an exterior surface with concealed portions of the exterior surface of the storage element adjacent and concealing inwardly directed concealed portions of the exterior wall of at least one of the head tube, down tube, and seat tube when the storage element is coupled to the frame,
    the storage element having exposed portions of its exterior surface which, when the storage element is coupled to the frame, together with exposed portions of the exterior surfaces of one or more of the head tube, down tube, and seat tube to which the storage element is adjacent forming in cross section normal to the central plane an oval shape generally symmetrical about the central plane and elongate in the forward direction
    wherein the oval shape is a teardrop shape having an enlarged rounded forward end and a reduced size rear end
    wherein the storage element bridges between the down tube and the seat tube, the down tube forms a front portion of the teardrop shape, the seat tube forms a rear portion of the teardrop shape and the storage element forms a middle portion of the teardrop shape.

2. The bicycle frame as claimed in claim 1 wherein the storage element extends from a junction where the rear end of the down tube and along each of the down tube and the seat tube towards the top tube.

3. The bicycle frame as claimed in claim 1 wherein the concealed portions of the exterior surface of the storage element have complementary mating shapes to shapes of the concealed portions of the exterior surface of the down tube and seat tube such that the concealed portions of the exterior surface of the storage element are adjacent.

4. The bicycle frame as claimed in claim 3 wherein the complementary mating shapes of the concealed portions of the exterior surface of the storage element engage with the shapes of the concealed portions of the exterior surface of the head tube, down tube, and seat tube when the storage element is coupled to the frame to prevent relative movement of the storage element normal to the central plane.

5. The bicycle frame as claimed in claim 1 wherein the storage element is removably coupled to the frame.

6. The bicycle frame as claimed in claim 1 wherein the storage element has an interior storage compartment.

7. A bicycle frame comprising:
a top tube with a front end and a rear end,
a head tube with a top end and a lower end,
a down tube with a front end and a rear end,
a seat tube with a top end and lower end,
the front end of the top tube connected to the top end of the head tube,
the front end of the down tube connected to the lower end of the head tube,
the top tube and down tube diverging away from each other as the top tube and the down tube extend rearwardly from the head tube,
the rear end of the down tube coupled to the lower end of the seat tube,
the rear end of the top tube top connected to the top end of the seat tube,
the top tube, head tube, down tube and seat tube substantially forming a closed main frame loop about a hollow central cavity,
the head tube adapted to be coupled to a pivotable front fork which carries a front wheel and handlebars,
the top tube, head tube, down tube, and seat tube each comprises a tubular member extending about a respective longitudinal axis,
the longitudinal axis each of the top tube, head tube, down tube, and seat tube lies in a flat longitudinal central plane,
the frame in normal use in a bicycle is adapted to be moved in a forward direction with the head tube and down tube forward of the seat tube and the top tube extending generally in the forward direction,
the each tubular member having a circumferential wall about its respective longitudinal axis with the circumferential wall having an exterior surface generally symmetrical about the central plane,
the each tubular member having inwardly directed portions of its exterior surface facing the central cavity,
a storage element disposed within the central cavity coupled to the frame,
the storage element having an exterior surface with concealed portions of the exterior surface of the storage element adjacent and concealing inwardly directed concealed portions of the exterior wall of at least one of the head tube, down tube, and seat tube when the storage element is coupled to the frame,
the storage element having exposed portions of its exterior surface which when the storage element is coupled to the frame, together with exposed portions of the exterior surfaces of one or more of the head tube, down tube, and seat tube to which the storage element is adjacent forming in cross section normal to the central plane an oval shape generally symmetrical about the central plane and elongate in the forward direction
wherein the oval shape is a teardrop shape having an enlarged rounded forward end and a reduced size rear end
wherein the storage element is adjacent the head tube rearward from the head tube with the head tube forming a front portion of the teardrop shape and the storage element forming a rear portion of the teardrop shape.

8. The bicycle frame as claimed in claim 7 wherein the storage element extends from a junction where the front end of the top tube is connected to the top end of the head tube along the top tube towards its rear end and along the head tube toward the down tube.

9. The bicycle frame as claimed in claim 7 wherein the storage element bridges between the down tube and the top tube.

10. The bicycle frame as claimed in claim 9 wherein the storage element is adjacent the down tube rearward of the down tube,
the head tube forming an upper front portion of the teardrop shape,
the down tube forming a lower front portion of the teardrop shape below the upper front portion,
the storage element forming a rear portion of the tear drop shape rearward of the head tube and the down tube.

11. The bicycle frame as claimed in claim 10 wherein the storage element is removably coupled to the frame.

12. The bicycle frame as claimed in claim 10 wherein the storage element has an interior storage compartment.

13. The bicycle frame as claimed in claim 10 wherein the concealed portions of the exterior surface of the storage element have complementary mating shapes to shapes of the concealed portions of the exterior surface of the head tube, down tube, and top tube such that the concealed portions of the exterior surface of the storage element are adjacent.

14. The bicycle frame as claimed in claim 13 wherein the complementary mating shapes of the concealed portions of the exterior surface of the storage element engage with the shapes of the concealed portions of the exterior surface of the head tube, down tube, and top tube when the storage element is coupled to the frame to prevent relative movement of the storage element normal to the central plane.

15. The bicycle frame as claimed in claim 9 wherein the storage element extends from a junction where the front end of the top tube is connected to the top end of the head tube along the top tube towards its rear end and to a junction where the front end of the down tube connected to the lower end of the head tube and along the head tube towards its lower end.

16. The bicycle frame as claimed in claim 7 wherein the storage element bridges between the head tube and the top tube.

17. The bicycle frame as claimed in claim 7 wherein the storage element is removably coupled to the frame.

18. The bicycle frame as claimed in claim 7 wherein the storage element has an interior storage compartment.

19. The bicycle frame as claimed in claim 7 wherein the concealed portions of the exterior surface of the storage element have complementary mating shapes to shapes of the concealed portions of the exterior surface of the top tube, head tube, and down tube such that the concealed portions of the exterior surface of the storage element are adjacent.

20. The bicycle frame as claimed in claim 19 wherein the complementary mating shapes of the concealed portions of the exterior surface of the storage element engage with the shapes of the concealed portions of the exterior surface of the top tube, head tube, and down tube when the storage element is coupled to the frame to prevent relative movement of the storage element normal to the central plane.

21. A bicycle frame comprising:
a top tube with a front end and a rear end,
a head tube with a top end and a lower end,
a down tube with a front end and a rear end,
a seat tube with a top end and lower end,
the front end of the top tube connected to the top end of the head tube,
the front end of the down tube connected to the lower end of the head tube,
the top tube and down tube diverging away from each other as the top tube and the down tube extend rearwardly from the head tube,
the rear end of the down tube coupled to the lower end of the seat tube,
the rear end of the top tube top connected to the top end of the seat tube,
the top tube, head tube, down tube and seat tube substantially forming a closed main frame loop about a hollow central cavity
the head tube adapted to be coupled to a pivotable front fork which carries a front wheel and handlebars,
the top tube, head tube, down tube, and seat tube each comprises a tubular member extending about a respective longitudinal axis,
the longitudinal axis each of the top tube, head tube, down tube, and seat tube lies in a flat longitudinal central plane,
the frame in normal use in a bicycle is adapted to be moved in a forward direction with the head tube and down tube forward of the seat tube and the top tube extending generally in the forward direction,
the each tubular member having a circumferential wall about its respective longitudinal axis with the circumferential wall having an exterior surface generally symmetrical about the central plane,
the each tubular member having inwardly directed portions of its exterior surface facing the central cavity,
a storage element disposed within the central cavity coupled to the frame,
the storage element having an exterior surface with concealed portions of the exterior surface of the storage element adjacent and concealing inwardly directed concealed portions of the exterior wall of at least one of the head tube, down tube, and seat tube when the storage element is coupled to the frame,
the storage element having exposed portions of its exterior surface which, when the storage element is coupled to the frame, together with exposed portions of the exterior surfaces of one or more of the head tube, down tube, and seat tube to which the storage element is adjacent forming in cross section normal to the central plane an oval shape generally symmetrical about the central plane and elongate in the forward direction
wherein the oval shape is a teardrop shape having an enlarged rounded forward end and a reduced size rear end
wherein the storage element is adjacent the seat tube forward of the seat tube with the storage element forming a front portion of the teardrop shape and the seat tube forming a rear portion of the tear drop shape.

22. The bicycle frame as claimed in claim 21 wherein the storage element bridges between the seat tube and the top tube.

23. The bicycle frame as claimed in claim 22 wherein the storage element extends from a junction where the rear end of the top tube is connected to the top end of the seat tube along the top tube towards its front end and along the seat tube towards its lower end.

24. The bicycle frame as claimed in claim 21 wherein the storage element is removably coupled to the frame.

25. The bicycle frame as claimed in claim 21 wherein the storage element has an interior storage compartment.

26. The bicycle frame as claimed in claim 21 wherein the concealed portions of the exterior surface of the storage element have complementary mating shapes to shapes of the concealed portions of the exterior surface of the seat tube and top tube such that the concealed portions of the exterior surface of the storage element are adjacent.

27. The bicycle frame as claimed in claim 26 wherein the complementary mating shapes of the concealed portions of the exterior surface of the storage element engage with the shapes of the concealed portions of the exterior surface of the seat tube and top tube when the storage element is coupled to the frame to prevent relative movement of the storage element normal to the central plane.

* * * * *